US012300200B2

(12) United States Patent
Tusko, Jr.

(10) Patent No.: US 12,300,200 B2
(45) Date of Patent: May 13, 2025

(54) FRET TOOL

(71) Applicant: Bernard Joseph Tusko, Jr., San Clemente, CA (US)

(72) Inventor: Bernard Joseph Tusko, Jr., San Clemente, CA (US)

( * ) Notice: Subject to any disclaimer, the term of this patent is extended or adjusted under 35 U.S.C. 154(b) by 243 days.

(21) Appl. No.: 17/993,954

(22) Filed: Nov. 24, 2022

(65) Prior Publication Data

US 2023/0162710 A1 May 25, 2023

Related U.S. Application Data

(60) Provisional application No. 63/283,172, filed on Nov. 24, 2021.

(51) Int. Cl.
*G10D 3/06* (2020.01)

(52) U.S. Cl.
CPC ..................................... *G10D 3/06* (2013.01)

(58) Field of Classification Search
CPC ............ G10D 3/06; G10D 1/085; G10D 3/22; G10D 3/00; B24D 15/02
See application file for complete search history.

(56) References Cited

U.S. PATENT DOCUMENTS

2014/0199919 A1* 7/2014 Bissoli .................... G10D 3/06 451/28

FOREIGN PATENT DOCUMENTS

WO WO-2019060528 A1 * 3/2019 ............ B24D 15/02

* cited by examiner

*Primary Examiner* — Kimberly R Lockett
(74) *Attorney, Agent, or Firm* — LOZA & LOZA, LLP; Kevin L. Soules

(57) ABSTRACT

A system, method, and apparatus for shaping frets can comprise a fret tool, the fret tool further comprising a fret tool body configured with at least one edge, the at least one edge further comprising a groove with a filing surface therein. The groove can be selected to have an incomplete radial shape on each side, with the respective radial walls of the groove being moved toward one another to form a point or crease at the center of the groove.

19 Claims, 9 Drawing Sheets

FRET TOOL

CROSS REFERENCE TO RELATED APPLICATIONS

This patent application claims the priority and benefit under 35 U.S.C. § 119(e) of U.S. Provisional Patent Application Ser. No. 63/283,172 filed Nov. 24, 2021, entitled "FRET TOOL." U.S. Provisional Patent Application Ser. No. 63/283,172 is herein incorporated by reference in its entirety.

TECHNICAL FIELD

Embodiments are generally related to the field of hand tools. Embodiments are also related to musical instrument tools. Embodiments are further related to fret shaping, and fret shaping tools. Embodiments are related to repairing frets. Embodiments are related to fret files, fret crowning, fret dressing, and fret leveling. Embodiments are also directed to systems, methods, and apparatuses for fret shaping, which can be characterized as creating ideal geometry for each individual fret or group of frets.

BACKGROUND

Fretted musical instruments are ubiquitous. Most people are familiar with guitars, which are the most popular western musical instrument with frets. However, there are numerous musical instruments that include frets. The very foundation of every fretted instrument's sound is the connection between the instrument's fret and strings.

The fret (or fretbar) can be understood to be a raised bar on the neck of stringed instrument such as a guitar. Frets often extend across the width of the neck below the strings. On most fretted instruments, such as guitars, the frets can comprise metal strips embedded or otherwise mounted into the fingerboard of the instrument. Frets are generally spaced to allow the musician to create various tones by pressing the string against the fret which changes the vibration length of the string, and the associated sound or pitch created by the string vibration.

Frets are constructed to be durable. However, as strings rub against the frets the tops of the frets begin to wear. For example, a newly installed fret will have a rounded crown. The rounded crown provides a positive, and clearly defined, string take-off point at its center. As the stringed instrument is used, friction between the string and the top of the fret causes wear. The resulting wear grooves (aka "fret wear") in the frets caused by the string friction, significantly disturb the original string take-off point. These wear grooves can only be repaired by a process called "fret leveling". Worn frets cannot be leveled one-at-a-time, therefore the other frets surrounding the worn frets also need to be "leveled" down to a point that is equal to the deepest wear groove on any single fret.

This results in a leveling of the top of the fret. The flattened top of the fret moves the string take-off point closer to the bridge which creates a shorter vibrating string length, and in turn, changes the string pitch and "intonation" (ability to play in tune) of the instrument. This hard, squared shoulder on the fret also makes the instrument less smooth, less pleasant, and more difficult to play.

While filing tools exist, most are configured with a cutting groove which is created with a standard ball end mill and a perfectly spherical profile. This means that the file removes material from the top center of the fret, making it very difficult to ensure the tops of all the frets are on the same plane. Other tools have a "V" shaped filing groove, which poses its own set of problems—namely, the two flat filing surfaces create flat spots, or "facets" in the previously rounded fret crown.

As such, current tools for reshaping frets are inadequate since such solutions tend not to provide the specific geometry necessary to make repairing and shaping the fret, while preserving the level plane of the fret tops, simple and easy. As such, a need exists for simple fret shaping/repairing tools as disclosed herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a hand tool.

It is another aspect of the disclosed embodiments to provide a method and system/apparatus for a fret repairing tool.

It is another aspect of the disclosed embodiments to provide a fret file.

It is another aspect of the disclosed embodiments to provide a fret crowning tool.

It is another aspect of the disclosed embodiments to provide a fret dressing tool.

It is another aspect of the disclosed embodiments to provide a fret leveling tool.

It is another aspect of the disclosed embodiments to provide methods, systems, and apparatuses for repairing musical instruments.

It is another aspect of the disclosed embodiments to provide methods, systems, and apparatuses for shaping frets in order to create the ideal fret shape and geometry, to repair the associated instrument.

It is another aspect of the disclosed embodiments to provide a tool for maintaining a single, perfectly level/equal plane among all of the fret tops during fret leveling. In certain embodiments, the flattened top of the fret can then be "re-crowned" to re-create the original rounded crown. This is accomplished with the disclosed fret crowning file. Thus, according to the disclosed embodiments, during the fret crowning process the level and equal plane among the fret tops can be maintained and preserved, while also creating the ideal fret geometry for each individual fret.

The aforementioned aspects and other objectives and advantages can now be achieved as described herein. In general, a system, method, and apparatus for repairing frets comprises a tool body, the tool body further comprising a groove formed in at least one side of the tool body and a handle connected to the tool body.

In further embodiments the disclosed invention comprises a fret tool body configured with at least one edge, the at least one edge further comprising a groove with a filing surface therein. The groove can be selected to have an incomplete radial shape on each side, with the respective radial walls of the groove being moved toward one another to form a point or crease at the center of the groove.

In an embodiment a tool comprises a tool body, the tool body further comprising a groove formed in at least one side of the tool body and an abrasive or filing surface in the groove, and a handle connected to the tool body. In an embodiment, the groove formed in at least one side of the tool body further comprises a first groove formed on a first side of the tool body and a second groove formed on a second side of the tool body. In an embodiment, the first groove formed on the first side of the tool body and the second groove formed on a second side of the tool body are different sizes. In an embodiment, the abrasive surface further comprises a file configured on a surface of the groove formed in the at least one side of the tool body. In an embodiment, the file further comprises at least one of a ridge file with cutting teeth and a diamond file. In an embodiment, the groove is configured with an obtuse point forming a crease in the center of an incomplete sphere. In an embodiment, the first side of the tool body comprises an edge of the tool body. In an embodiment, the tool body is configured to be wider at a handle side of the tool body and narrower at a distal end of the tool body. In an embodiment, the tool further comprises a hole formed in the handle. In an embodiment, the tool further comprises a groove formed in at least one side of the handle. In an embodiment, the tool further comprises an outboard lip of the groove, wherein the outboard lip has rounded contours.

In an embodiment, a fret shaping tool comprises a tool body, the tool body further comprising: a first groove formed in a first edge of the tool body, a second groove formed in a second edge of the tool body, an abrasive surface in the groove; and a handle connected to the tool body, wherein the tool body is wider at an end connected to the handle and narrows toward the distal end. In an embodiment, the first groove formed on the first side of the tool body and the second groove formed on a second side of the tool body are different sizes. In an embodiment, the abrasive surface further comprises a file configured on a surface of the groove formed in the at least one side of the tool body. In an embodiment, the file further comprises at least one of a ridge file with cutting teeth and a diamond file. In an embodiment, the first groove is configured with an obtuse point forming a crease in the center of an incomplete sphere and wherein the second groove is configured with an obtuse point forming a crease in the center of an incomplete sphere.

In an embodiment, a tool comprises a first tool body, the first tool body further comprising: a groove formed in at least one side of the tool body and an abrasive surface in the groove; a second tool body, the second tool body further comprising a groove formed in at least one side of the tool body and an abrasive surface in the groove; and a rib connecting the first tool body and the second tool body. In an embodiment, the groove formed in at least one side of the first tool body further comprises: a first groove formed on a first side of the first tool body and a second groove formed on a second side of the first tool body, wherein the first groove formed on the first side of the first tool body and the second groove formed on a second side of the first tool body are different sizes. In an embodiment, the groove formed in at least one side of the second tool body further comprises: a first groove formed on a first side of the second tool body and a second groove formed on a second side of the second tool body, wherein the first groove formed on the first side of the second tool body and the second groove formed on a second side of the second tool body are different sizes. In an embodiment, the abrasive surface further comprises a file configured on a surface of the first groove formed in the at least one side of the first tool body and a file configured on a surface of the second groove formed in the at least one side of the second tool body.

BRIEF DESCRIPTION OF THE FIGURES

The accompanying figures, in which like reference numerals refer to identical or functionally-similar elements throughout the separate views and which are incorporated in, and form a part of the specification, further illustrate the embodiments and, together with the detailed description, serve to explain the embodiments disclosed herein.

DETAILED DESCRIPTION

Figure 1A:
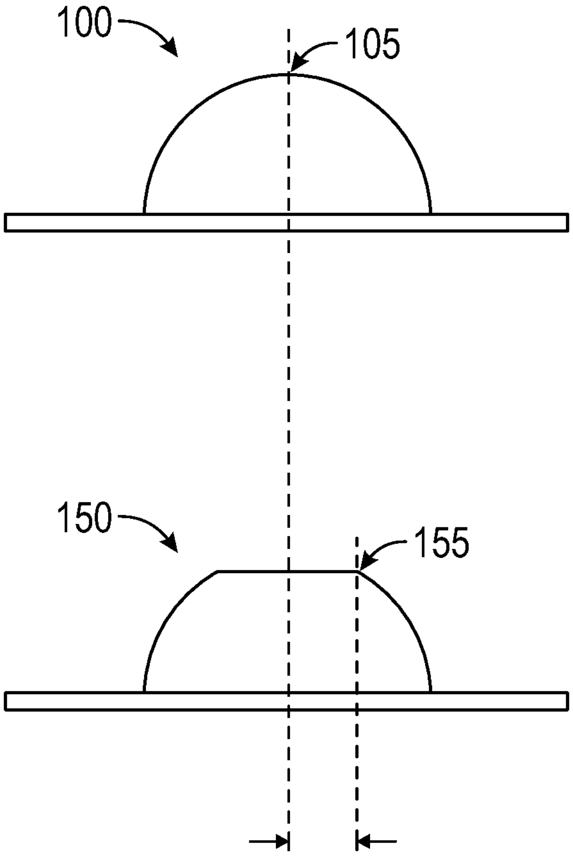
FIG. 1A depicts views of a fret, both leveled and rounded, in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms “a”, “an”, and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase “in one embodiment” as used herein does not necessarily refer to the same embodiment and the phrase “in another embodiment”

as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context. All aspects of the various embodiments, can be interchangeable with aspects disclosed in other embodiments, and/or can be incorporated in other embodiments.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

FIG. 1A illustrates a newly installed fret 100 which has a rounded crown 105. The rounded crown provides a positive, and clearly defined, string take-off point at its center. As the instrument is played, the friction between the string and the top of the fret causes wear. The grooves can only be repaired by fret leveling. However, worn frets cannot be leveled one-at-a-time. The other frets surrounding the worn frets also need to be "leveled" down to a point that is equal to the deepest wear groove on any single fret. Fret tuning therefore results in a leveling of the top 155 of the leveled fret(s) 150.

Figure 1B:
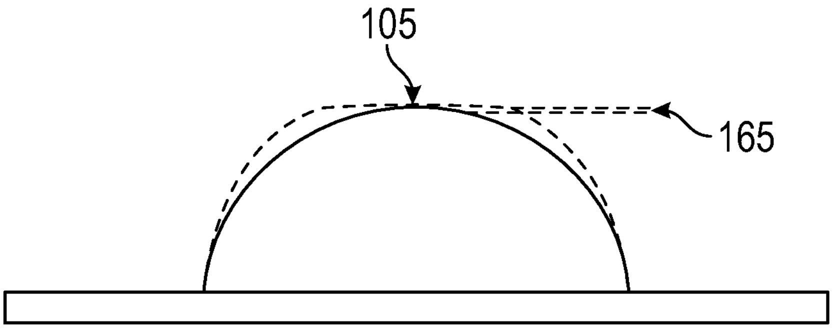
FIG. 1B illustrates the top center portion of a fret, in accordance with the disclosed embodiments.

Fret crowning is a very specialized technique, the end goal of which, is to re-create the rounded fret crown, after the fret top has been leveled (as illustrated in FIG. 1B), in order to correct for the wear caused by strings, or by uneven fret installation. For best results, it is preferable that the top of every fret is perfectly in line, and on the same plane as every other fret. However, it is very difficult to prevent removal of material from the top center of the fret, which alters the leveled portion of the fret. Even a small amount of material removed from a previously leveled fret, as illustrated by gap 165 in FIG. 1B, will have a significant impact on the instrument's playability and tone. It the top of one of the fret is uneven, the adjacent frets will no longer be in the same plane with each other.

The disclosed embodiments are configured to allow a user to accurately, and with a high degree of control, recreate the rounded fret crown, without allowing the file's cutting surface to touch the very peak (sometimes referred to as a "land" or "pinnacle") of the fret, until the very last file stroke; or in some cases, leaving only the finest sliver to be polished away.

In certain embodiments, a fret shaping tool 200 is disclosed. The fret shaping tool 200 generally includes a tool body 205, and a handle 210. The tool body 205 can be configured with a filing groove 220 on one or more sides of the tool body 205. The filing groove 220 is configured with a specially configured filing surface which can be used to remove material from a fret, in order to restore the shape of the fret.

In various embodiments, the fret shaping tools disclosed herein can be used to shape frets by drawing the tool along frets on a stringed instrument, to change the shape of the frets.

Figure 2A:
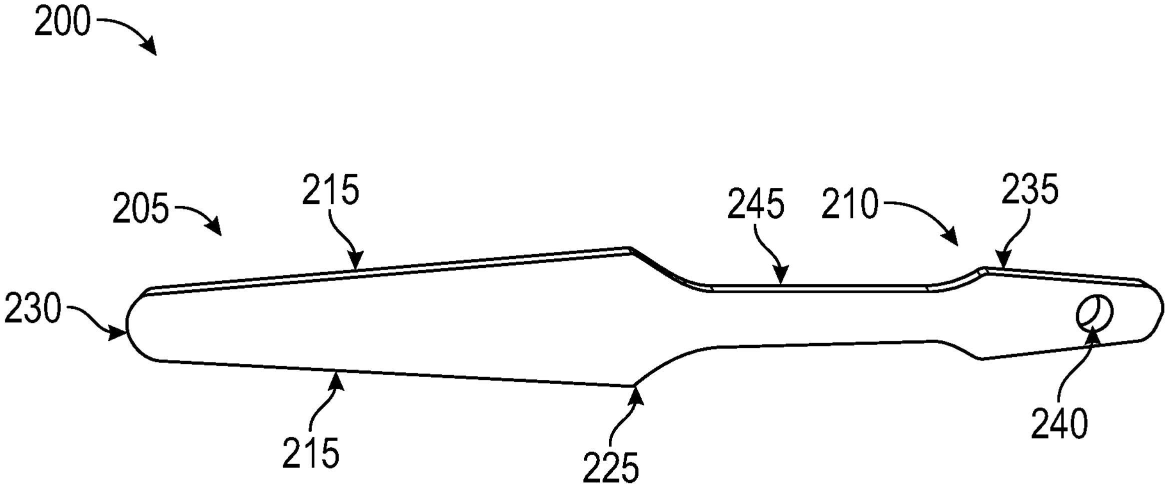
FIG. 2A depicts a fret shaping tool, in accordance with the disclosed embodiments.

FIG. 2A illustrates an embodiment of a fret shaping tool 200 in accordance with the disclosed embodiments. The fret shaping tool 200 comprises a fret tool body 205 and a handle 210. The handle 210 and fret tool body 205 can be configured to be integrated in a single piece, or can be configured as multiple pieces. In general, the fret tool body 205 and handle 210 can be formed of metal, but in other embodiments, other materials can be used. The fret tool body 205 material can be selected to be rigid and can comprise, polymer, plastic, wood, other rigid materials, or combinations thereof.

In an exemplary embodiment, as illustrated in FIG. 2A, the fret body 205 is configured with a thin cross-sectional profile. That is to say, the fret body 205 and/or handle 210 are selected to be generally flat with a thickness of 2.5 mm-7 mm. In other embodiments, other dimensional sizes are possible, but the disclosed embodiments are generally within a range that makes application to a stringed instrument easy. In certain embodiments, the fret tool body 205 can be wider at the handle end 225, and can narrow or taper toward the distal end 230. The rate of tapering can be selected to allow the fret body 205 to conveniently engage with frets of differing sizes on a musical instrument for fret shaping.

The handle 210 can be configured with a hand grip 245 and flared distal end 235. The flared distal end 235 can further include a strap hole 240.

Figure 2B:
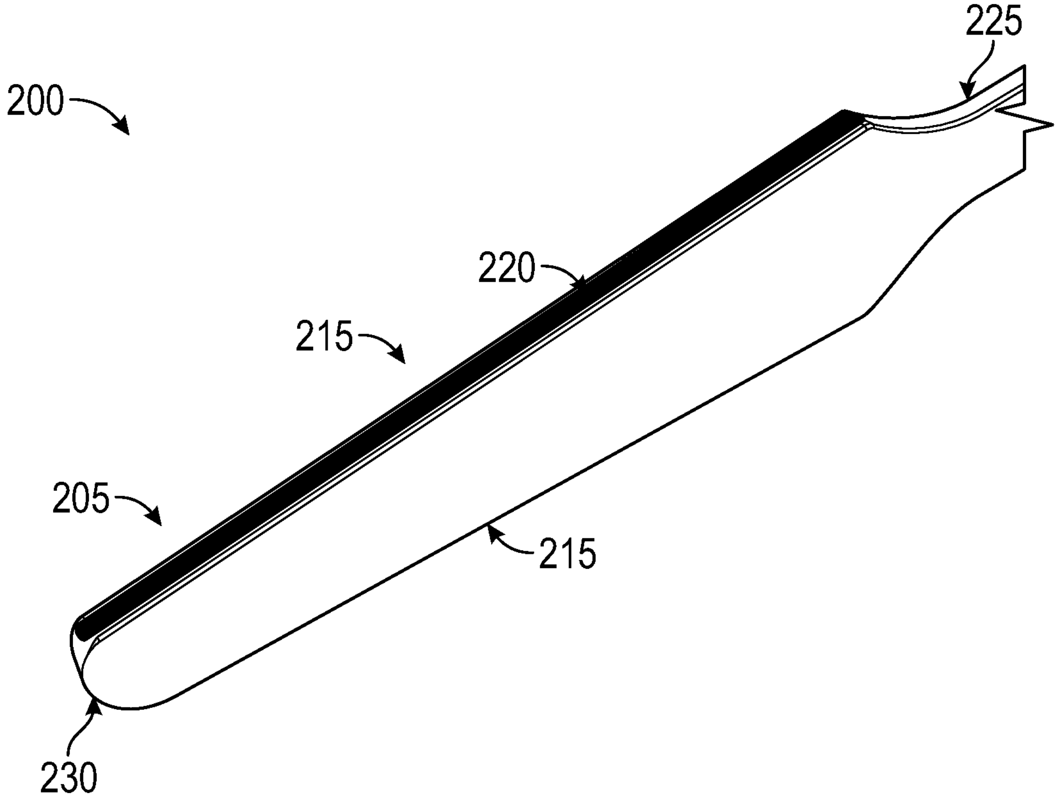
FIG. 2B depicts another view of a fret shaping tool, in accordance with the disclosed embodiments.

The edges 215 of the fret tool body 205 can be configured with a filing groove 220 as illustrated in FIG. 2B. In certain embodiments, the dimensions of the filing groove 220 can differ on the respective edges 215, in order to accommodate frets of varying sizes.

FIG. 2B illustrates an exploded view of the filing groove 220. It should be noted that the filing groove 220 can be included on one or both of the top and bottom edges 215 of the tool body 205. In certain embodiments, the size of the filing groove 220 on one edge 215 can be selected to match one common fret size, and the filing groove 220 on the other edge 215 can be selected to match a different common fret size.

Figure 2C:
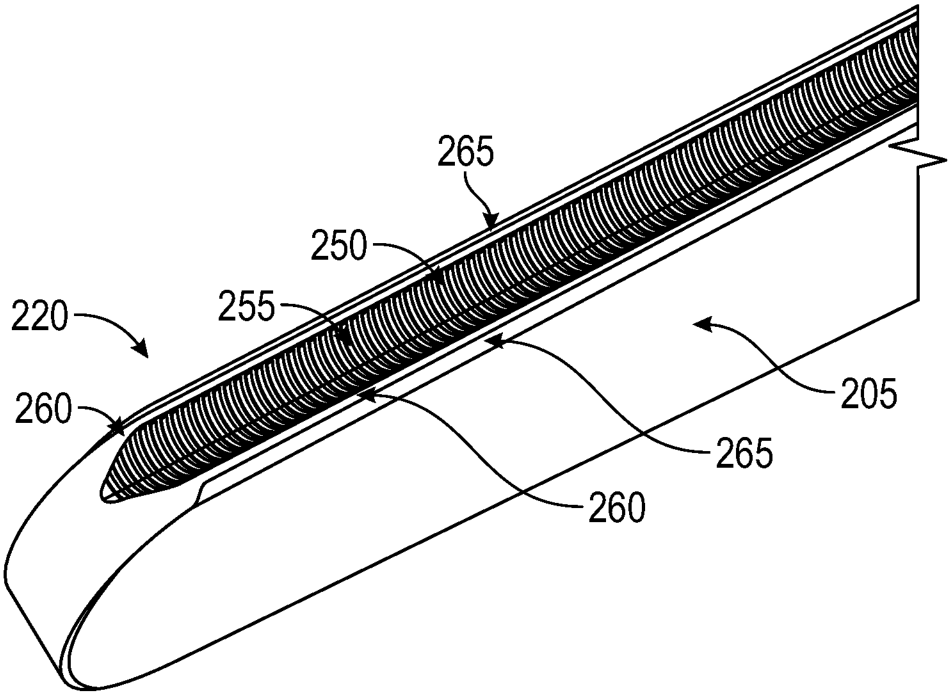
FIG. 2C depicts an exploded view of a fret shaping tool body, in accordance with the disclosed embodiments.

Additional aspects of the tool 200 are illustrated in the exploded view of the tool body 205, including the filing surface 250 in FIG. 2C. The filing surface 250 can be an abrasive surface. The filing groove 220 is configured with a concave filing surface 250. The filing surface 250 can generally comprise a series of filing ridges 255 (also referred to as a warding surface or ridge surface) with cutting teeth formed in, or by, the ridges 255.

In the exemplary embodiment illustrated in FIG. 2C, the tool body 205 has smooth radii and contours 260 along the outboard lip 265 of the actual filing groove 220, to prevent the file 200 from digging into the fingerboard, or side of the fret during use. This is further illustrated in FIG. 3D.

For example, in certain embodiments the outboard lip 265 of the filing groove 250 can have simple 45° bevels on the inner and outer corners 260. In another embodiment, the lip 265 can comprise full and continuous rounded contours 260 as shown in FIG. 3D.

Figure 3A:
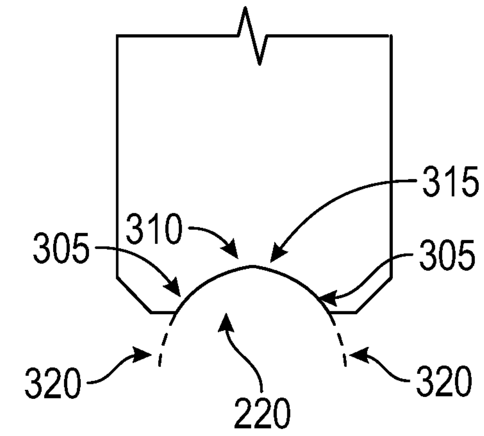
FIG. 3A depicts exemplary geometry of a fret tool, in accordance with the disclosed embodiments.

FIG. 3A, illustrates an aspect of the disclosed embodiments which includes a specially selected profile 315 for the groove 220, and associated filing surface 250, which provides optimal fret shaping. The groove 220 and filing surface 250 can be selected such that each side 305 of the groove 220 has a perfect radii as illustrated by dotted line 320, but the respective sides 305 of the groove are shifted toward one another slightly creating an obtuse point or crease 310 in the center of the groove 220 as illustrated in FIG. 3A. The groove 220 thus comprises an obtuse point or crease 310 with an incomplete sphere forming the respective sides 305 as illustrated. The point or crease is configured to help the user prevent the file from touching the very top centerline of the fret, during fret re-crowning (filing) after leveling. It is, of course, still possible for the file to touch the fret centerline (when enough strokes are used), but the user has a much higher degree of control during the last few filing strokes.

Figure 3B:
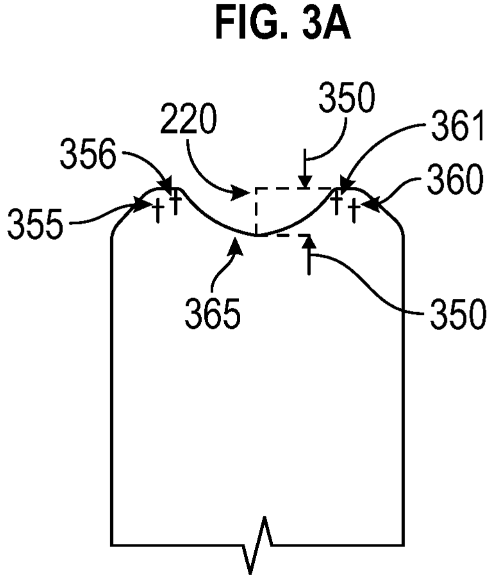
FIG. 3B depicts exemplary geometry of a fret tool, in accordance with the disclosed embodiments.
Figure 3C:
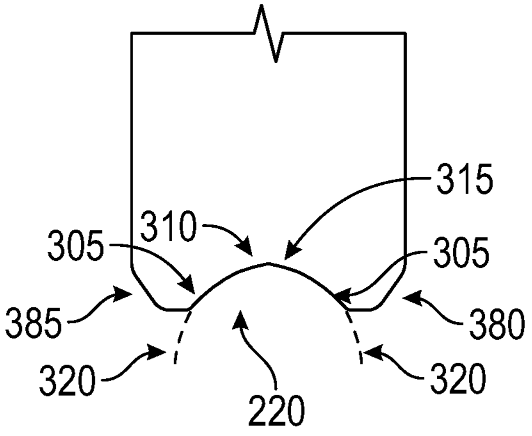
FIG. 3C depicts a fret tool applied to a fret, in accordance with the disclosed embodiments.
Figure 3D:
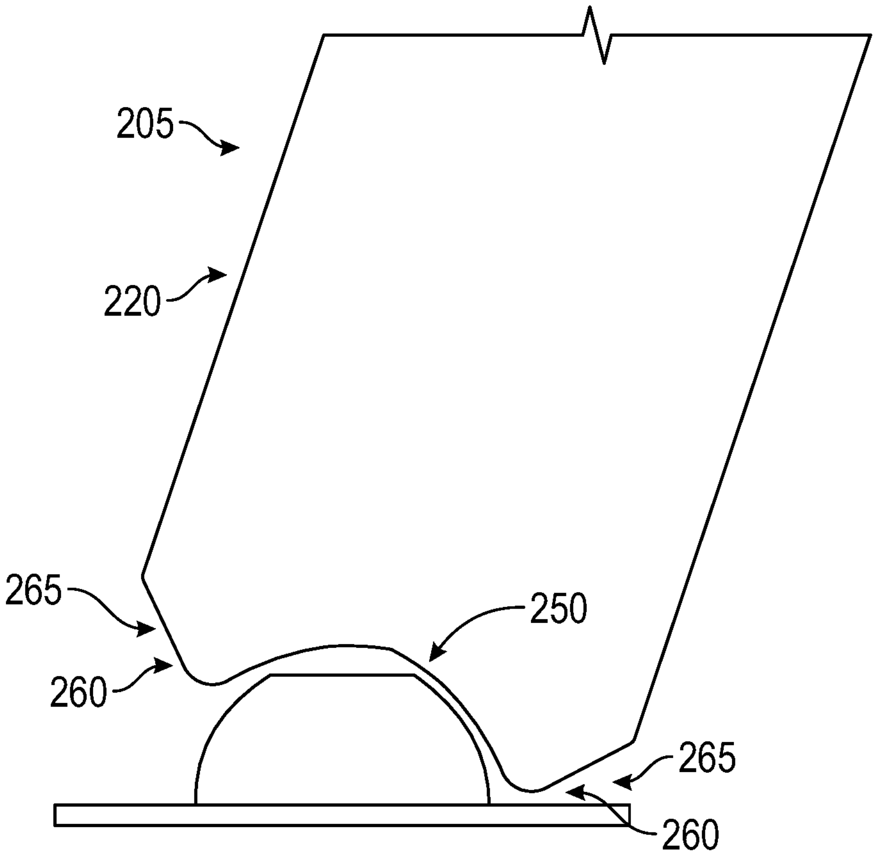
FIG. 3D depicts a fret tool applied to a fret, in accordance with the disclosed embodiments.
Figure 3E:
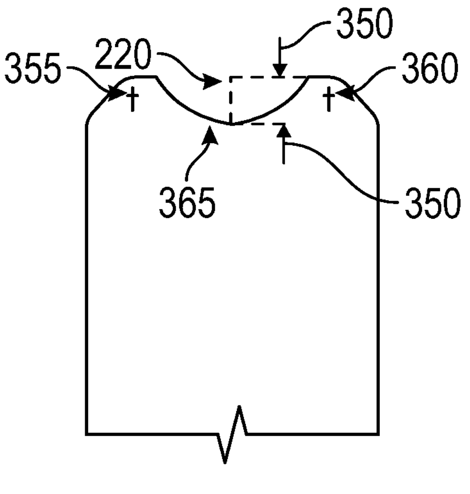
FIG. 3E depicts exemplary geometry of a fret tool, in accordance with the disclosed embodiments.

FIG. 3B and FIG. 3E illustrate additional aspects of the embodiments, specifically, the groove 220 depth can be related to the relative radii 320. For example, the groove depth "d" is illustrated by marks 350. The radius R1 355 represents the curvature of the left side of the shoulder adjacent to the groove 220, and the radius R2 360 represents the curvature of the right side shoulder adjacent to the groove 220. The radius at R3 365 at the center point 310 represents the radius at the center of groove 220.

Dimensions provided herein are exemplary. However, for purposes of illustration, if the depth d is 0.8 mm, the dimensions R1 and R2 can be given by equations (1) and (2) respectively, and the dimension R3 can be given by equation (3):

$$R1=2\times R\ 0.35 \tag{1}$$

$$R2=2\times R\ 0.35 \tag{2}$$

$$R3=R\ 1.87 \tag{3}$$

Tolerances may be required for all tool measurements. In the disclosed embodiments, tolerances within + or −0.02 may be acceptable for radial dimensions.

In certain embodiments, the following exemplary method can be used to arrive at the desired shape of groove 220. Starting with an exemplary 10 mm rod, in order to create a perfectly spherical end, a 5 mm radius would be required, starting from each side and meeting in the middle. This is illustrated in Equation (4) at the apex as:

$$10\text{ mm}\div 2=5\text{ mm} \tag{4}$$

However, the optimal shape is rounded with a very small tip or point in the center, creating a corresponding (mirror image) crease 310 in the center of the groove 220. Thus, for the same 10 mm rod, an exemplary radius, and associated shape is defined by equation (5):

$$10\text{ mm}\div 2=5\text{ mm}\times 1.1=5.5\text{ mm radius} \tag{5}$$

Where the 5.5 mm radius starts from either side of the center point of the groove to create a very small point or crease 310. Thus, in an exemplary embodiment an optimized file shape can comprise the file groove 220 and the inner and outer edges and contours formed as a radius (e.g. as inner radius 356 and outer radius 355 on one side and as inner radius 361 and outer radius 360 on the other side), as given above, but with each of the edges moved slightly as given by equation (5), for example, to create a slight point or crease 310 (e.g. an interrupted radius) in the center of the groove 220 as illustrated in FIG. 3A.

The multiplier in equation (5) is given as 1.1 for purposes of illustration. However, it should be appreciated that in other embodiments, other multipliers can also be used. In certain embodiments, the multiplier can range from 1.05 to 2.

It should be appreciated that this method can be used for any diameter rod with any length, as required to adjust the size of the tool 200 to fit various fret sizes. Frets can be various sizes. Thus, it should be appreciated that, in various embodiments, the size of the groove 220 can be selected to address the desired application. It should be further appreciated that the modification of the file tool 200 to not have a perfectly rounded inner profile is important. Shaping a fret is a delicate and difficult exercise. The fret tools disclosed herein, including the obtuse point 310 with an incomplete sphere forming the respective sides, allows the tool 200 to shape the fret without shaving the top off the fret as the file is used, significantly improving the filing control and efficiency, and resulting fret shape.

FIG. 3D illustrates another embodiment of the fret shaping tool wherein the shoulders of the tool are configured with a continuous radial profile. As illustrated in FIG. 3D, right shoulder 380 can be curved from its intersection with the filing groove 220 to the side of the tool body. Likewise, the left shoulder 385 can be curved from its intersection with the filing groove to the side of the tool body.

Figure 4:
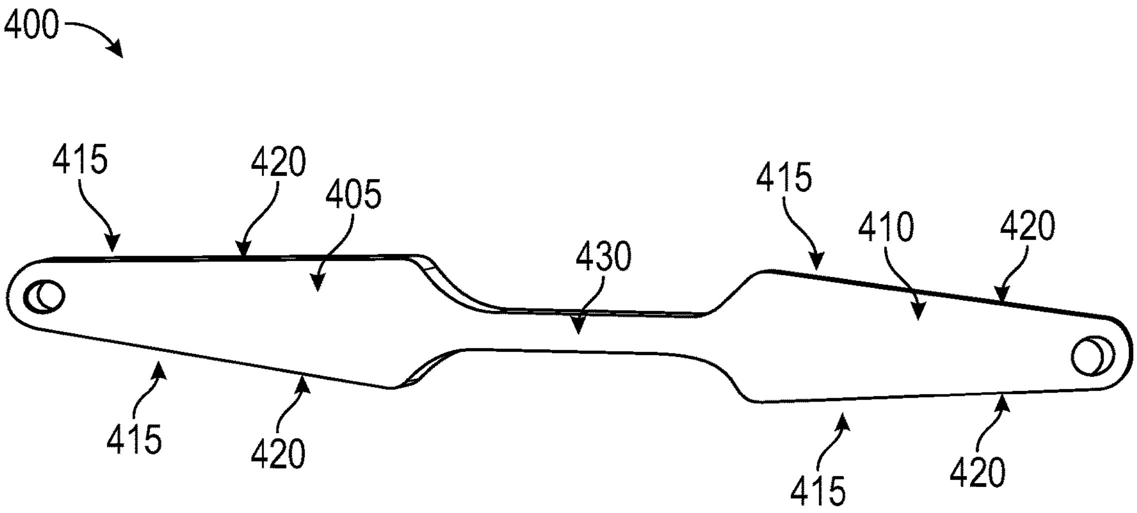
FIG. 4 depicts another embodiment of a fret tool, in accordance with the disclosed embodiments.

In another exemplary embodiment illustrated in FIG. 4, a fret shaping system 400 can be configured to comprise a first body 405 and a second body 410 connected by a rib 430. In one embodiment, each of the edges 415 of the first body 405 and the second body 410 can have one groove size. In another embodiment, each of the edges 415 of the first body 405 can have a first sized groove 420, and the edges 415 of the second body 410 can have a different sized groove 420. In other embodiments, each of the four respective edges 415 of first body 405 and second body 410 can have a different groove size. In certain embodiments, the groove size can be selected to match the most common four fret sizes. In further embodiments, certain of the grooves along the respective edges 415, can be selected to have different file surfaces. In should be appreciated that aspects of the embodiments illustrated in FIGS. 2 and 3 can be incorporated in the fret shaping system 400.

Figure 5A:
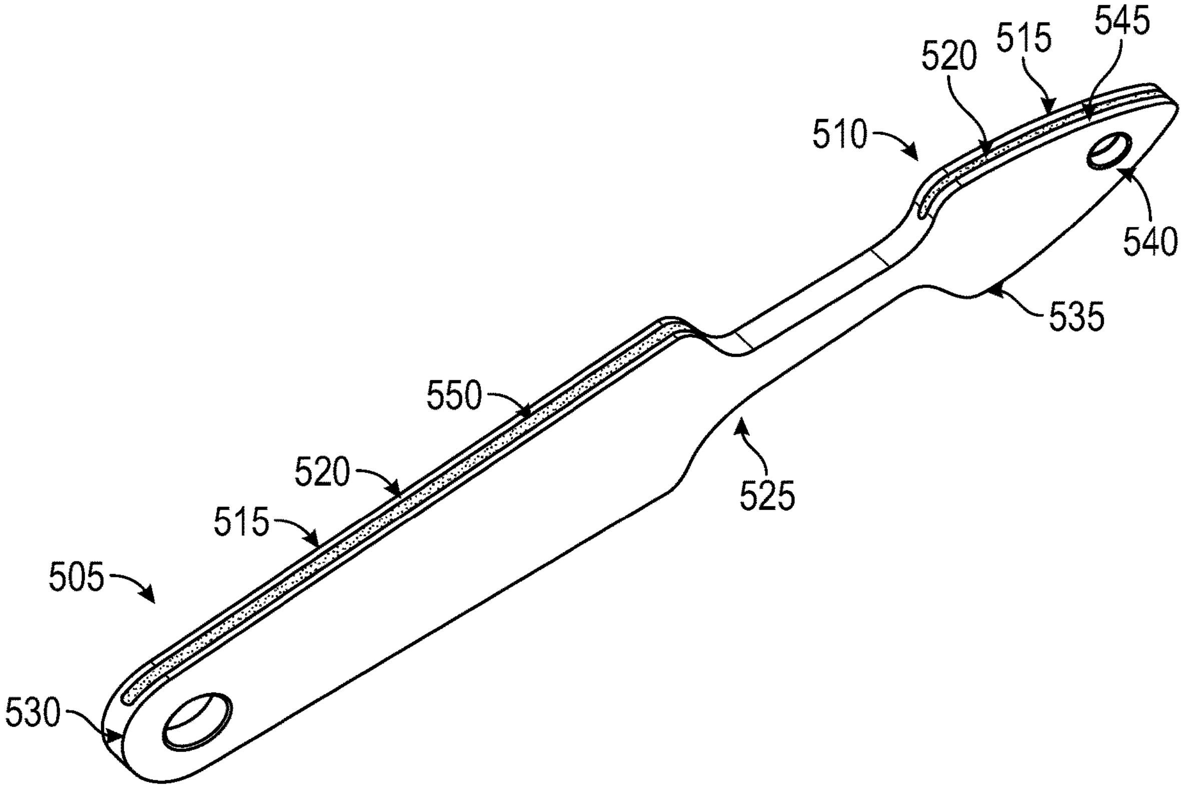
FIG. 5A depicts a diamond fret tool, in accordance with the disclosed embodiments.

FIG. 5A illustrates another embodiment of a diamond fret shaping tool 500 in accordance with the disclosed embodiments. The diamond fret shaping tool 500 can comprise a fret tool body 505 and a handle 510. The handle 510 and fret tool body 505 can be configured to be integrated. In general, the fret tool body 505 and handle 510 can be formed of metal, but in other embodiments, other materials can be used. The fret tool body 505 material can be selected to be rigid.

In an exemplary embodiment, as illustrated in FIG. 5A, the fret body 505 is configured with a narrow profile. The edges 515 of the fret tool body 505 can be configured with a filing groove 520. In certain embodiments, the size of the filing groove 520 can differ on the respective edges 515. In certain embodiments, the fret tool body 505 can be wider at the handle end 525 and can narrow, or taper, toward the distal end 530. The tapering is selected to allow the fret body tool to conveniently engage with frets for fret shaping. Additionally, the edge 515 between the handle end 525 and distal end 530 can be convex or bowed, to ease access to difficult to reach frets.

The handle 510 can be configured with a hand grip 545 and flared distal end 535. The flared distal end 535 can further include a strap hole 540 (which can also be used to hang the tool on a wall). In addition, the handle 510 can be configured with a filing groove 520 with a filing surface 550 therein. The filing groove 520 on the handle 510 can be selected to have a different size than the filing groove 520 on the tool body 505, to accommodate use of the tool on different sized frets/instruments. It should be appreciated that the filing groove can similarly be included on the handle of other embodiments disclosed herein.

Figure 5B:
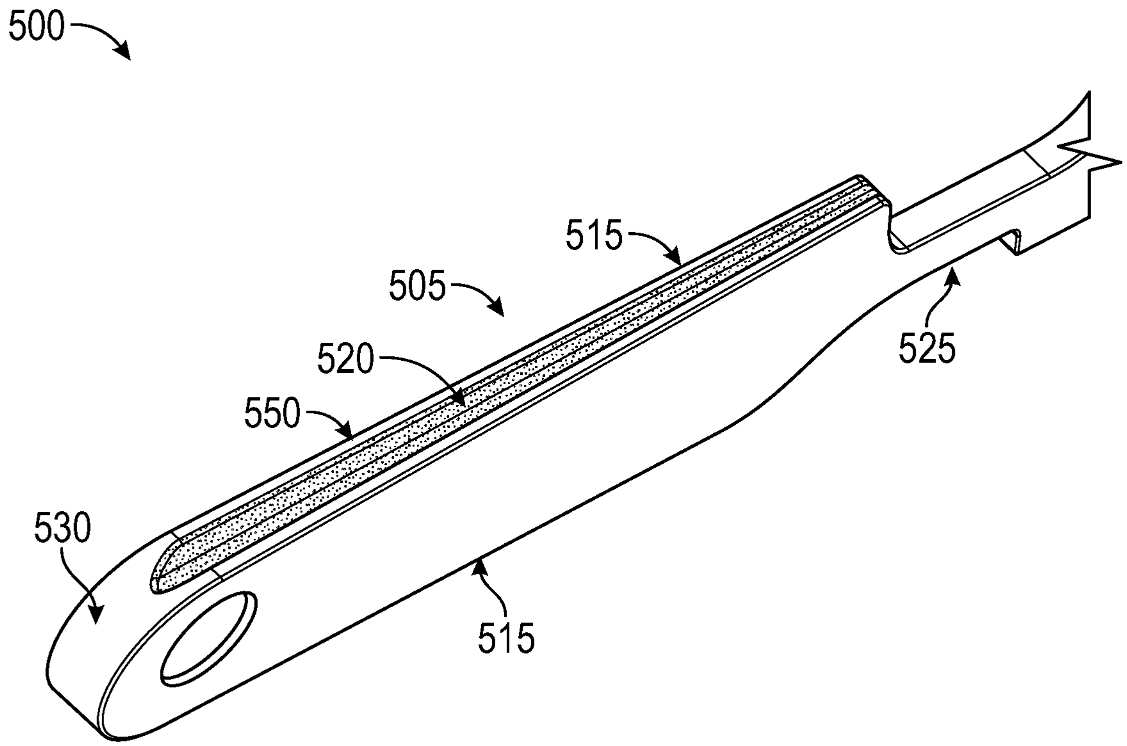
FIG. 5B depicts an exploded view of a diamond fret tool body, in accordance with the disclosed embodiments.

FIG. 5B illustrates an exploded view of the filing groove 520. It should be noted that the filing groove 520 can be included on both the top and bottom edges 515. The filing groove 520 is configured with a concave filing surface 550, which can comprise a diamond filing surface.

Figure 6:
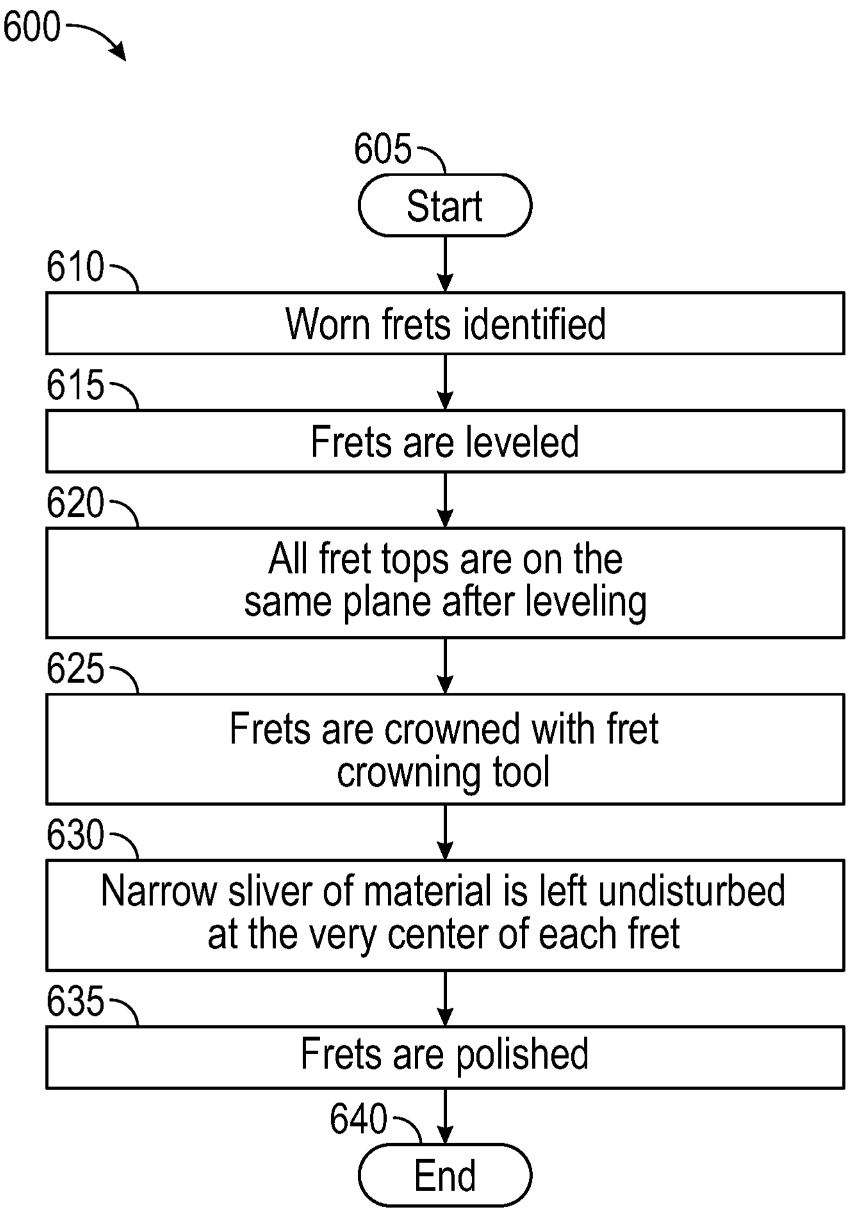
FIG. 6 illustrates steps in a method for shaping frets, in accordance with the disclosed embodiments.

FIG. 6 illustrates steps associated with a method 600 for shaping frets with a fret shaping tool as disclosed herein. The method begins at step 605. At step 610, frets on a musical instrument that require repair are identified. In most cases, this can involve identifying worn frets which have been gradually flattened by friction.

At step 615 the frets can be leveled. It is important to note that, in order for the instrument to play correctly, the top of each of the frets must be leveled and be in the same plane as every other fret. As illustrated at 620, all the frets' tops are on the same plane after leveling.

At step 625, the frets can be crowned with a fret tool. Crowning the fret can include filing the frets to remove squared corners and/or the hard edges, so that the fret is returned to its original rounded shape. However, as illustrated at step 630, the fret crowning can be accomplished using the disclosed systems and tools. In certain embodiments, the tool with the crease is used to help prevent the file from touching the very top centerline of the fret, during fret re-crowning (filing) after leveling. In certain embodiments, a sliver of material may be left at the very center of each fret.

Once the frets have been shaped, at step 635, the frets can be polished. The polishing finishes the process, so that the frets are ready for the instrument to be restrung and played. The method ends at 640.

Figure 7:
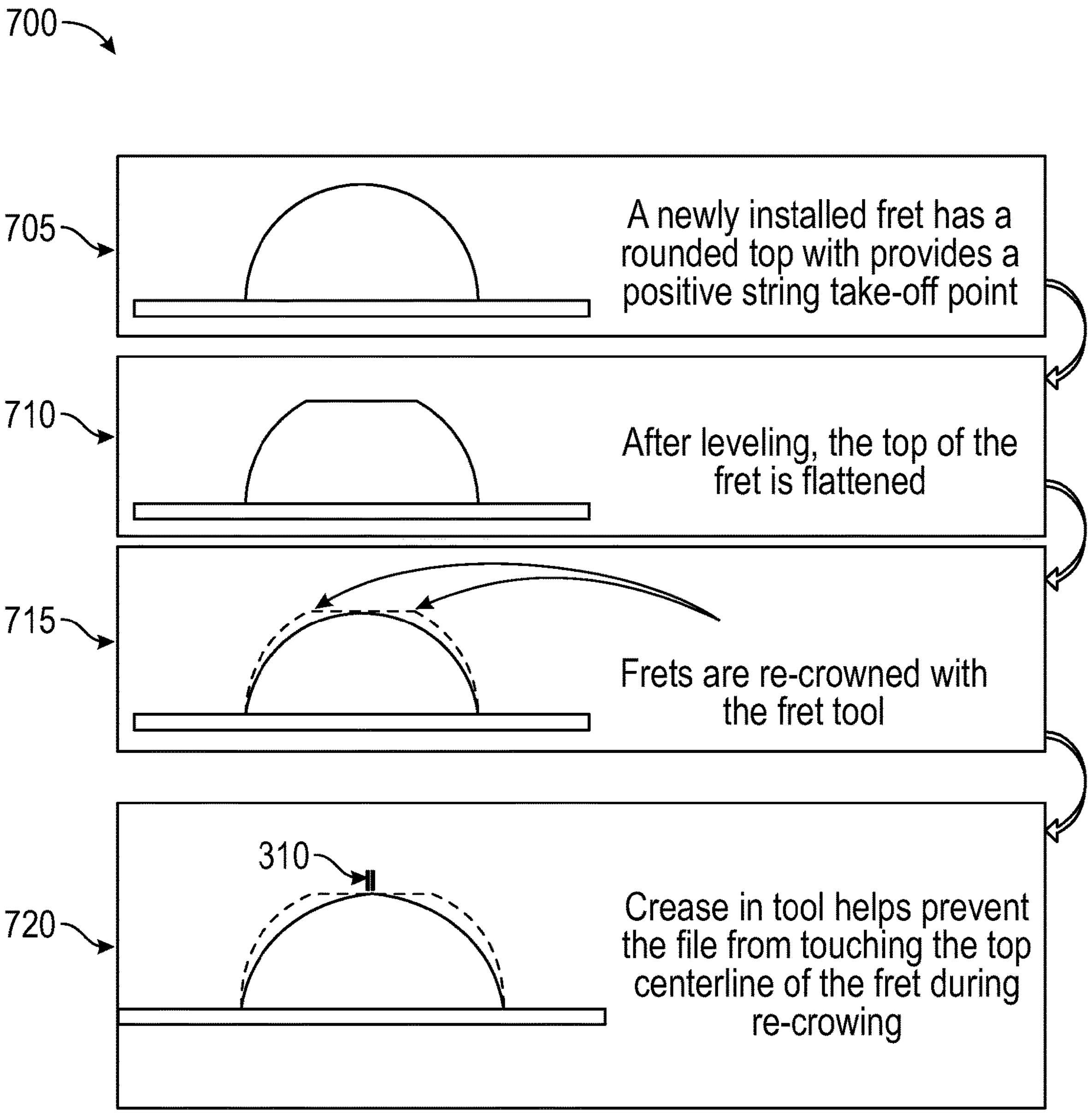
FIG. 7 illustrates steps in a method for shaping frets, in accordance with the disclosed embodiments.

FIG. 7 illustrate steps in a method 700 for leveling and shaping a fret, or fret(s), using a fret tool as disclosed herein and in accordance with the disclosed embodiments. 705 illustrates a newly installed fret that has a rounded crown. The rounded crown provides a positive string take-off point, at the center of the fret. Once the fret is worn, a process for leveling and reshaping is required.

As illustrated at 710, the worn fret can be leveled. After leveling, the top of the fret is flattened. This moves the string takeoff point closer to the bridge, which changes the intonation (the musical pitch or note becomes higher), and/or tone of the instrument. It should be understood that fret leveling can be accomplished using a tool to ensure all the frets are equivalently level as further detailed herein.

Once all the frets are level, the fret can be "crowned" or shaped as illustrated at 715, to remove the material from the shoulders of the fret in order to reestablish a rounded crown and positive string take-off point.

As illustrated at 720, the fret(s) can be shaped, using the disclosed tool, with a crease at the center of the filing groove as disclosed herein. The tool gives the user additional control and helps the user prevent the file from touching the very top centerline of the fret, during fret re-crowning (filing) after leveling. This ensures that the plane among all the frets is the same. As noted, the fret can then be smoothed and polished, at which point the fret shaping method, is complete.

Based on the foregoing, it can be appreciated that a number of embodiments, preferred and alternative, are disclosed herein. For example, in an embodiment a tool comprises a tool body, the tool body further comprising a groove formed in at least one side of the tool body and an abrasive surface in the groove, and a handle connected to the tool body.

In an embodiment, the groove formed in at least one side of the tool body further comprises a first groove formed on a first side of the tool body and a second groove formed on a second side of the tool body.

In an embodiment, the first groove formed on the first side of the tool body and the second groove formed on a second side of the tool body are different sizes.

In an embodiment, the abrasive surface further comprises a file configured on a surface of the groove formed in the at least one side of the tool body.

In an embodiment, the file further comprises at least one of a ridge file with cutting teeth and a diamond file.

In an embodiment, the groove is configured with an obtuse point forming a crease in the center of an incomplete sphere.

In an embodiment, the first side of the tool body comprises an edge of the tool body.

In an embodiment, the tool body is configured to be wider at a handle side of the tool body and narrower at a distal end of the tool body.

In an embodiment, the tool further comprises a hole formed in the handle.

In an embodiment, the tool further comprises a groove formed in at least one side of the handle.

In an embodiment, the tool further comprises an outboard lip of the groove, wherein the outboard lip has rounded contours.

In an embodiment, a fret shaping tool comprises a tool body, the tool body further comprising: a first groove formed in a first edge of the tool body, a second groove formed in a second edge of the tool body, an abrasive surface in the groove; and a handle connected to the tool body, wherein the tool body is wider at an end connected to the handle and narrows toward the distal end.

In an embodiment, the first groove formed on the first side of the tool body and the second groove formed on a second side of the tool body are different sizes.

In an embodiment, the abrasive surface further comprises a file configured on a surface of the groove formed in the at least one side of the tool body.

In an embodiment, the file further comprises at least one of a ridge file with cutting teeth and a diamond file.

In an embodiment, the first groove is configured with an obtuse point forming a crease in the center of an incomplete sphere and wherein the second groove is configured with an obtuse point forming a crease in the center of an incomplete sphere.

In an embodiment, a tool comprises a first tool body, the first tool body further comprising: a groove formed in at least one side of the tool body and an abrasive surface in the groove; a second tool body, the second tool body further comprising a groove formed in at least one side of the tool body and an abrasive surface in the groove; and a rib connecting the first tool body and the second tool body.

In an embodiment, the groove formed in at least one side of the first tool body further comprises: a first groove formed on a first side of the first tool body and a second groove formed on a second side of the first tool body, wherein the first groove formed on the first side of the first tool body and the second groove formed on a second side of the first tool body are different sizes.

In an embodiment, the groove formed in at least one side of the second tool body further comprises: a first groove formed on a first side of the second tool body and a second groove formed on a second side of the second tool body, wherein the first groove formed on the first side of the second tool body and the second groove formed on a second side of the second tool body are different sizes.

In an embodiment, the abrasive surface further comprises a file configured on a surface of the first groove formed in the at least one side of the first tool body and a file configured on a surface of the second groove formed in the at least one side of the second tool body.

It will be appreciated that variations of the above-disclosed and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the following claims.

What is claimed is:

1. A tool comprising:
- a tool body, the tool body further comprising:
  - a groove formed in at least one side of the tool body wherein the groove is configured with a point forming a crease in the center of an incomplete sphere; and
  - an abrasive surface in the groove; and
- a handle connected to the tool body.

2. The tool of claim 1 wherein the groove formed in at least one side of the tool body further comprises:
- a first groove formed on a first side of the tool body; and
- a second groove formed on a second side of the tool body.

3. The tool of claim 2 wherein the first groove formed on the first side of the tool body and the second groove formed on a second side of the tool body are different sizes.

4. The tool of claim 1 wherein the abrasive surface further comprises:
- a file configured on a surface of the groove formed in the at least one side of the tool body.

5. The tool of claim 4 wherein the file further comprises at least one of:
- a ridge file with cutting teeth; and
- a diamond file.

6. The tool of claim 1 wherein the first side of the tool body comprises an edge of the tool body.

7. The tool of claim 1 wherein the tool body is configured to be wider at a handle side of the tool body and narrower at a distal end of the tool body.

8. The tool of claim 1 further comprising:
- a hole formed in the handle.

9. The tool of claim 1 further comprising:
- a groove formed in at least one side of the handle.

10. The tool of claim 1 further comprising:
- an outboard lip of the groove, wherein the outboard lip has rounded contours.

11. A fret shaping tool comprising:
- a tool body, the tool body further comprising:
  - a first groove formed in a first edge of the tool body wherein the first groove is configured with a point forming a crease in the center of an incomplete sphere;
  - a second groove formed in a second edge of the tool body;
  - an abrasive surface in the groove; and
- a handle connected to the tool body, wherein the tool body is wider at an end connected to the handle and narrows toward the distal end.

12. The fret shaping tool of claim 11 wherein the first groove formed on the first side of the tool body and the second groove formed on a second side of the tool body are different sizes.

13. The fret shaping tool of claim 11 wherein the abrasive surface further comprises:
- a file configured on a surface of the groove formed in the at least one side of the tool body.

14. The fret shaping tool of claim 13 wherein the file further comprises at least one of:
- a ridge file with cutting teeth; and
- a diamond file.

15. The fret shaping tool of claim 11 wherein
- the second groove is configured with a point forming a crease in the center of an incomplete sphere.

16. A tool comprising:
- a first tool body, the first tool body further comprising:
  - a groove formed in at least one side of the tool body wherein the groove is configured with a point forming a crease in the center of an incomplete sphere; and
  - an abrasive surface in the groove;

a second tool body, the second tool body further comprising:

a groove formed in at least one side of the tool body wherein the groove is configured with a point forming a crease in the center of an incomplete sphere; and an abrasive surface in the groove; and a rib connecting the first tool body and the second tool body.

17. The tool of claim 16 wherein the groove formed in at least one side of the first tool body further comprises:

a first groove formed on a first side of the first tool body; and a second groove formed on a second side of the first tool body;

wherein the first groove formed on the first side of the first tool body and the second groove formed on a second side of the first tool body are different sizes.

18. The tool of claim 16 wherein the groove formed in at least one side of the second tool body further comprises:

a first groove formed on a first side of the second tool body; and a second groove formed on a second side of the second tool body;

wherein the first groove formed on the first side of the second tool body and the second groove formed on a second side of the second tool body are different sizes.

19. The tool of claim 16 wherein the abrasive surface further comprises:

a file configured on a surface of the first groove formed in the at least one side of the first tool body; and a file configured on a surface of the second groove formed in the at least one side of the second tool body.

* * * * *